Feb. 4, 1941.    P. O. STEWART    2,230,818
MACHINE AND METHOD OF MAKING TERMINALS FOR ELECTROSTATIC CONDENSERS
Filed Nov. 10, 1939    5 Sheets-Sheet 1
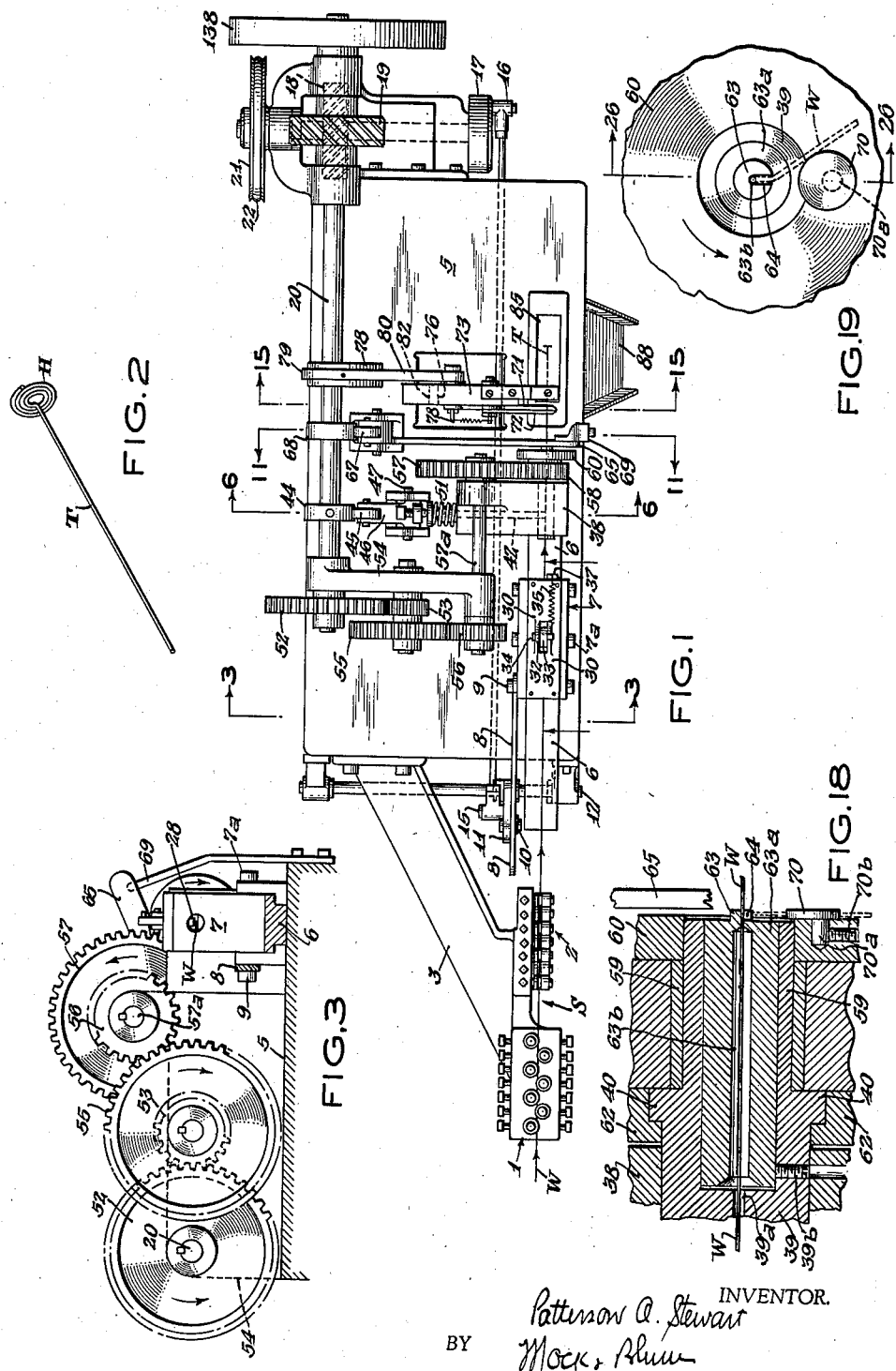
INVENTOR.
Patterson O. Stewart
BY Mock + Blum
ATTORNEYS

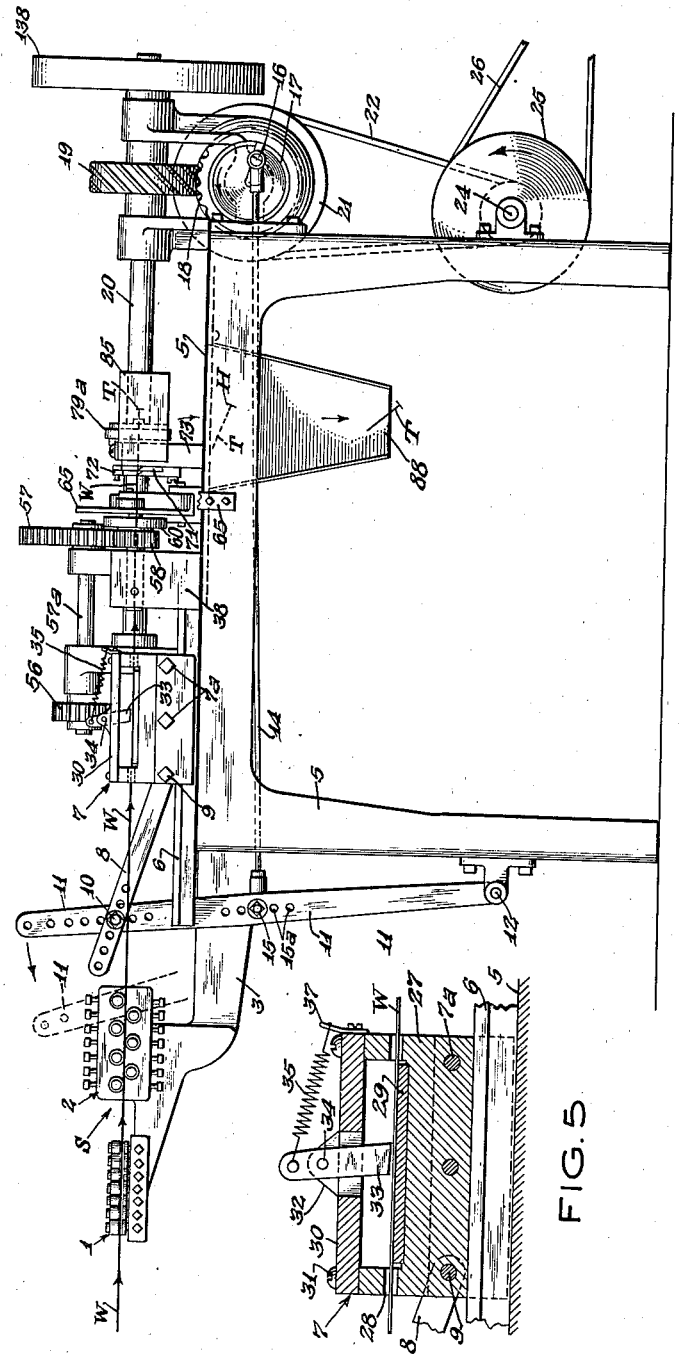

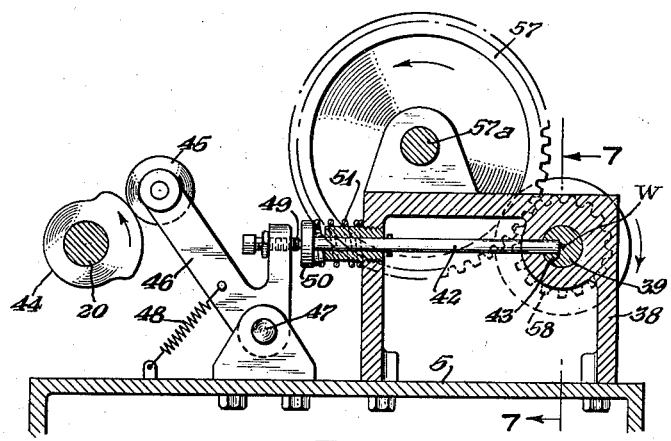
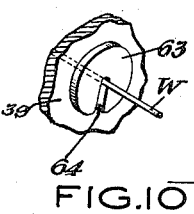
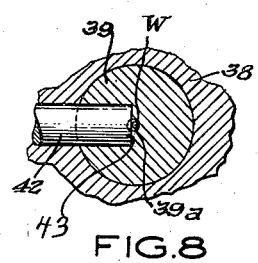
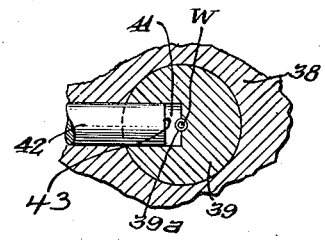
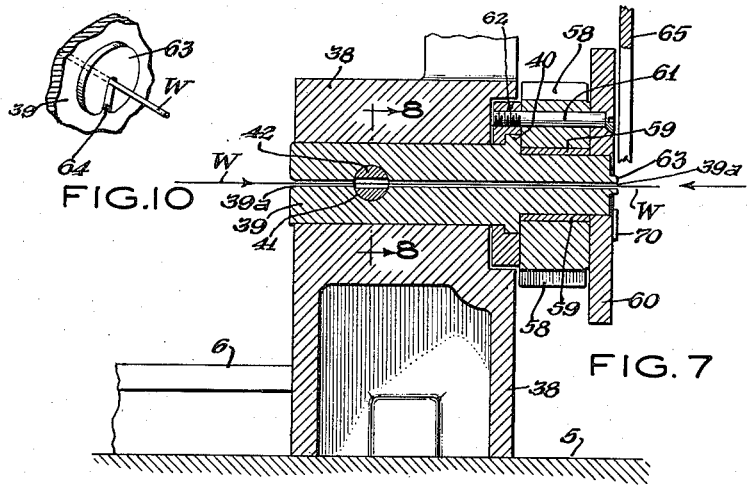

Feb. 4, 1941.   P. O. STEWART   2,230,818
MACHINE AND METHOD OF MAKING TERMINALS FOR ELECTROSTATIC CONDENSERS
Filed Nov. 10, 1939   5 Sheets-Sheet 4

INVENTOR.
Patterson O. Stewart
BY
Macks Blum
ATTORNEYS

Feb. 4, 1941.　　　　P. O. STEWART　　　　2,230,818
MACHINE AND METHOD OF MAKING TERMINALS FOR ELECTROSTATIC CONDENSERS
Filed Nov. 10, 1939　　　5 Sheets-Sheet 5

INVENTOR.
Patterson O. Stewart
BY Mock & Blum
ATTORNEYS

Patented Feb. 4, 1941

2,230,818

UNITED STATES PATENT OFFICE 2,230,818

MACHINE AND METHOD OF MAKING TERMINALS FOR ELECTROSTATIC CONDENSERS

Patterson O. Stewart, New York, N. Y.

Application November 10, 1939, Serial No. 303,764

6 Claims. (Cl. 140—92)

My invention relates to a new and improved machine and method for making terminals for electrostatic condensers, and for other purposes.

One of the objects of my invention is to provide improved mechanism for making pig-tail terminals.

Another object of my invention is to provide an improved full automatic machine into which wire can be fed and in which the heads of the terminals are wound and otherwise shaped and the completed devices are severed from the wire. These operations are performed without bending the wire, save during the operations of winding and shaping the heads.

Another object of my invention is to provide a machine of simple and reliable construction and which will have continuous automatic operation and high running speed and which will be simple to operate.

Other objects of my invention will be stated in the following description and drawings which illustrate preferred embodiments thereof.

Fig. 1 is a top plan view of a machine made according to one embodiment of the invention.

Fig. 2 is a perspective view showing a finished terminal which is made by the machine which is illustrated in Fig. 1.

Fig. 3 is a section, partially in elevation, on the line 3—3 of Fig. 1.

Fig. 4 is a side elevation of the machine which is illustrated in Fig. 1.

Fig. 5 is a transverse section, partially in elevation, of the slide-carriage which feeds the wire intermittently into the machine.

Fig. 6 is a section, partially in elevation, on the line 6—6 of Fig. 1.

Fig. 7 is a section on the line 7—7 of Fig. 6.

Fig. 8 is an enlarged sectional view on the line 8—8 of Fig. 7, of the means for locking the wire which is fed into the machine, so as to prevent the longitudinal movement of the wire during the winding operation. Fig. 8 shows the operative position of such locking device, in which it clamps the wire.

Fig. 9 is a view similar to Fig. 8 showing said locking device in the inoperative position, in which such device releases the wire.

Fig. 10 is a detailed enlarged perspective view showing the means for bending and winding the wire so as to make the head of a terminal.

Fig. 12 shows the positions of the respective parts for forming said head, at the beginning of this operation, after the wire has been bent and before any part of the head has been wound.

Fig. 18 is a detail view which shows a modified form of winding mandrel.

Fig. 19 is a detail view which shows a modified winding pin or projection.

Figure 11:
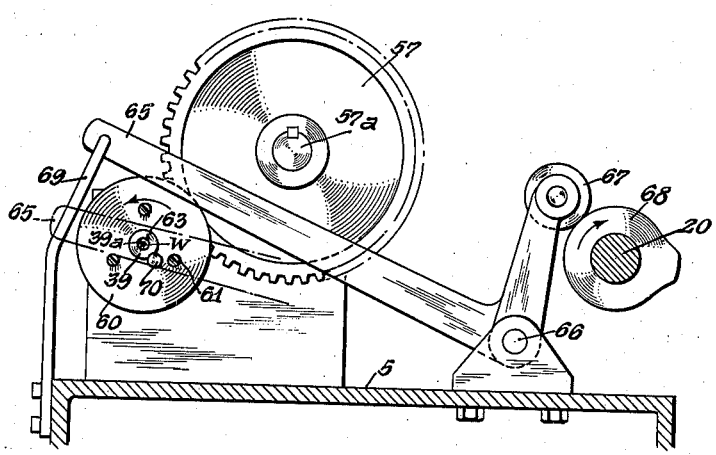
Fig. 11 is a sectional view, in elevation, on the line 11—11 of Fig. 1.

Referring to Fig. 1, the wire or other bendable material W is led from a suitable source (not shown), such as a spool or the like, to conventional straightening mechanism S, which is located at the front of the machine. Since this straightening mechanism is of conventional construction, it is sufficient to state that it has a set of rolls 1 and another set of rolls 2. In each set of rolls, the same are arranged in zigzag relation, as shown at the left-hand side of Fig. 1. The axes of rolls 2 are in a plane perpendicular to the axes of rolls 1. These rolls straighten out all kinks in the wire. The shafts of said rolls are supported in a bracket 3 which is connected to the frame of the machine. After having been straightened, the wire is fed intermittently into the machine.

Referring to Figs. 4 and 5, the frame 5 of the machine has a guide 6 of T-shaped cross-section rigidly connected thereto. A carriage 7 is slidably mounted upon said guide 6. Said carriage 7 comprises front and rear plates which are connected to each other by means of transverse bolts 7a. The inner adjacent walls of said plates are provided with recesses which interfit with the head of the guide 6 so that the carriage or slide 7 can move back and forth longitudinally but without shifting either upwardly or laterally. A link 8 is pivotally connected at 9 to one of the plates of the carriage 7. Said link 8 is adjustably connected by means of a pivot pin 10 to one of the holes of a lever 11, which is pivoted at 12 to the frame 5 of the machine. One end of a rod 14 is adjustably and pivotally connected by a pin 15 to one of the holes 15a of the lever 11. The other end of said rod 14 is pivotally and eccentrically connected by a pin 16 to a plate 17 which is keyed to the shaft of a spiral gear 18, which is driven by another spiral gear 19, which is keyed to the main operating shaft 20. The shaft of the gear 18 has a drive pulley 21 which is driven by a belt 22 from a pulley which is mounted on a drive shaft 24. Said drive shaft 24 has a pulley 25 which is driven by a belt 26 from any suitable source of power. The carriage 7 is thus reciprocated and the length of this reciprocation is controlled by the location of the pivot pin 15 in one of the respective holes 15a of the lever 11.

Fig. 5 shows a block 27 which is located between the plates of the slide carriage 7. This block 27 is connected to the plates of the slide carriage 7 by means of the bolts 7a. Said block 27 is provided with front and rear openings 28 through which the wire W passes. Said block 27 is also provided with an abutment block 29, which is made of hard steel or the like. A top plate 30 is connected to the block 27 by means of screws 31. Said top plate 30 has a vertical bore and it is provided with upstanding lugs 32 at said bore. A clamping lever 33 is pivotally connected to said lugs by pivot pin 34 and said clamping lever extends into the recess of the block 27. One end of a tension spring 35 is connected to the clamping lever 33 above its pivot pin 34, and the other end of said tension spring 35 is connected rigidly to the member 37, which is rigidly connected to the plate 30. The tension spring 35 therefore normally holds the bottom end of the clamping lever 33 against the wire W, so as to clamp said wire against the abutment plate 29. However, the force of spring 35 is slight.

Hence, during the reverse movement of carriage 7, towards the front end of the machine, the inclined lever 33 can turn and slip relative to the wire, which is then held stationary.

The bottom end of the clamping lever 33 is preferably chamfered so as to provide a blunt clamping edge which can firmly clamp the wire against the abutment plate 29 during the feeding stroke. When the slide carriage 7 is moved from left to right, referring to Figs. 4 and 5, the clamping lever 33 acts as a one-way feed pawl to clamp the wire against the abutment plate 29, so that the wire is then moved or fed in unison with the slide carriage 7. The wire W is held clamped against reverse movement, during the reverse movement of carriage 7, by clamping means which are located in casing 38. As shown in Fig. 7 and Fig. 9, a bar 39 is rigidly held by a drive fit or in any other suitable manner in a bore of a boss of the stationary casing 38.

As shown in Fig. 7, said bar 39 has a flange 40 intermediate its ends, and one end of said bar 39 is of smaller diameter than its other end. The cross-section of said bar 39 is circular. Said bar 39 has a fine longitudinal bore 39a through which the wire W is fed, and in which the wire fits slidably, with some clearance.

As shown in Figs. 8 and 9, the bar 39 has a transverse bore 41 whose axis is perpendicular to the bore 39a.

A plunger 42 is slidably located in said transverse bore 41. Said plunger 42 has a clamping end face 43. When the plunger 42 is in the inoperative position shown in Fig. 9, the wire can be fed freely through the bore 39a. When the plunger 42 is in the clamping position shown in Fig. 8, its clamping end-face 43 nips or clamps the wire W against the adjacent portion of the wall of the fine bore 39a, so that the wire W is held against movement.

As shown in Fig. 6, the main operating shaft 20 has a cam 44 which operates in association with a cam roller 45 which is turnably mounted on a lever 46, which is pivoted at 47 to the frame of the machine. The usual tension spring 48 maintains the cam-roller 45 in contact with the periphery of the cam 44. A push-screw 49 is adjustably connected to one arm of the lever 46. When the lever 46 is turned clockwise from the position shown in Fig. 6, the end of the screw 49 is pushed against the head 50 of the plunger 42. As shown in Fig. 6, the plunger 42 is slidable in a bearing recess which is provided in a wall of the casing 38. A compression spring 51 urges the head 50 into contact with the tip of the screw 49. This spring 51 biases the plunger 42 to the inoperative position which is shown in Fig. 9.

The cam 44 is timed so that plunger 42 releases the wire during the feeding stroke of the slide-carriage 7, and said plunger 42 clamps the wire during the reverse stroke of the slide-carriage, when said slide-carriage is moved towards the front end of the machine. The plunger 42 also clamps the wire while the head of the terminal is being wound and also when the shank of the terminal is being cut off the wire, subsequent to the winding operation.

As shown in Fig. 1, the main operating shaft 20 has a gear 52 which meshes with a smaller gear 53 on the usual countershaft. Said countershaft is mounted in a bracket 54 which is rigidly connected to the frame of the machine. Said bracket 54 also supports one of the bearings for the main operating shaft 20. This countershaft has a gear 55 which is larger than the gear 53 and said gear 55 meshes with a smaller gear 56, keyed to a countershaft 57a. The second countershaft 57a is provided with a gear 57, which is larger than the gear 56. As shown for example in Fig. 6, the gear 57 meshes with a smaller gear 58. These gears are conventional means for turning the gear 58 much more rapidly than the operating shaft 20 and any suitable gear ratio may be used for this purpose, and also for changing the speed of rotation of the winding plate 60.

Figure 12:
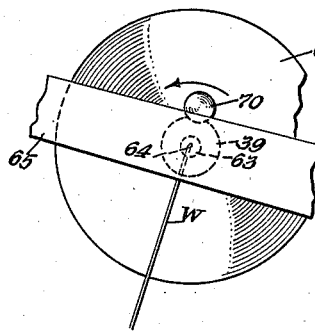
Fig. 12 is a detail view on a smaller scale than Fig. 10, of the means for bending and winding the wire so as to form the head of a terminal.

As shown in Fig. 7, the hub of the gear 58 is rigidly assembled with a bearing bushing 59, which is mounted turnably upon the reduced adjacent end-portion of the bar 39. The winding or turning plate 60 is connected to a screw 61 which passes through a suitable eccentric bore of the gear 58. The winding plate 60 and the gear 58 therefore turn in unison. The inner end of the screw 61 is threaded into the retaining ring 62, which is mounted partially upon the flange 40 of the bar 39 and also on the portion of said bar at the left-hand side of said flange. The ring 62 can therefore freely turn in unison with the gear 58 and the winding plate 60, but said ring and gear 58 and plate 60 cannot move in a direction parallel to the axis of bore 39a. As shown in Figs. 7 and 10, the stationary bar 39 has a projection or mandrel 63 which is provided with a radial slot 64, into which the end-portion of the wire, which projects beyond said mandrel 63, can be bent laterally as shown in Fig. 12. Said mandrel projects rearwardly of plate 60.

As shown in Fig. 18, the mandrel 63 may be part of a pin 63a, which is mounted detachably in bar 39. The bore 63b of pin 63a may have its longitudinal axis coincident with or offset relative to the axis of bore 39a. The axes of bores 39a and 63b are parallel.

As shown in Figs. 1 and 11, a bending lever 65 is pivotally connected at 66 to the frame of the machine. Said lever has a roller 67 which cooperates with a cam 68 on the operating shaft 20. A guide 69 is fixed to the frame of the machine, and one face of the lever 65 is moved in sliding contact with said guide. At the completion of each intermittent feeding movement of the slide carriage 7, the free end of the wire projects rearwardly beyond the winding plate 60. Therefore, a straight horizontal portion of the wire projects rearwardly of the slot 64, as shown in Fig. 10, at the completion of each feeding movement of the slide carriage 7. When the lever 65 is turned counter-clockwise from the position shown in Fig. 11, it downwardly bends this projecting portion of the wire W to the position shown in Fig. 12. At the completion of this bending movement, a part of the bent projection of the wire is located in the slot 64. Said bent projection is perpendicular to the body of the wire.

Figure 13:
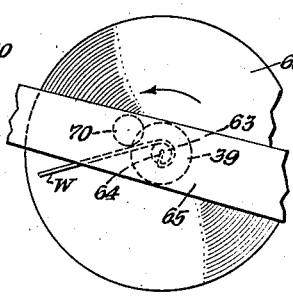
Fig. 13 is similar to Fig. 12, showing the positions of the parts of Fig. 12, a short time after the winding operation has begun.
Figure 14:
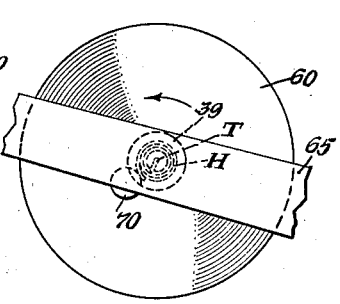
Fig. 14 is a view similar to Figs. 12 and 13, showing the completion of the winding operation.

As shown in Figs. 7 and 11, the winding plate 60 is provided with an eccentrically located cylindrical pin or projection 70. As the plate 60 is turned continuously, its pin projection 70 will turn in unison therewith, until said projection 70 contacts with the laterally bent wire W, as shown in Fig. 13. This rotating movement of the projection 70 will wind the laterally bent portion of the wire W into the form of a spiral, around the rim of the central projection 63, as illustrated in Fig. 13, which shows the formation of a part of the completed spiral. The completion of this operation is shown in Fig. 14.

As shown in Fig. 19, the cylindrical pin 70 may be pivoted eccentrically at 70a to plate 60, to permit the winding of heads of different outside diameters. The respective removable pins 63a have mandrels 63 of different outside diameters. Hence by selecting a pin 63a and by adjusting pin 70 on its shaft or pivot 70a, the machine can wind heads of different internal and external diameters.

During the next feeding movement of the carriage 7, the completed head H of the terminal T is fed rearwardly in unison with the straight wire until said head is located rearwardly of the transverse plane in which the cutting mechanism is operated, and a suitable portion of the straight wire is also fed rearwardly of said plane.

Figure 15:
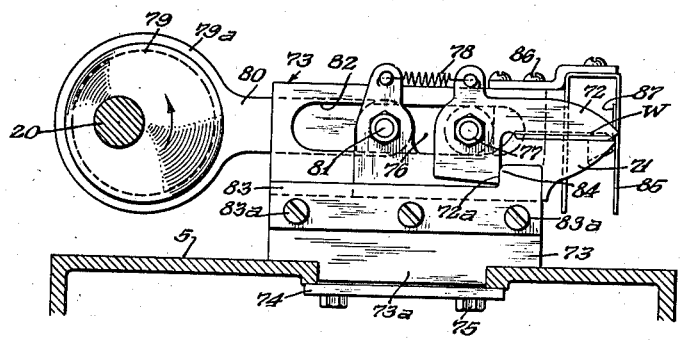
Fig. 15 is a sectional view, partially in elevation, on the line 15—15 of Fig. 1. This figure illustrates the mechanism for cutting the wire and it shows the positions of the parts of the cutting mechanism, immediately after a completed terminal has been cut from the wire.
Figure 16:
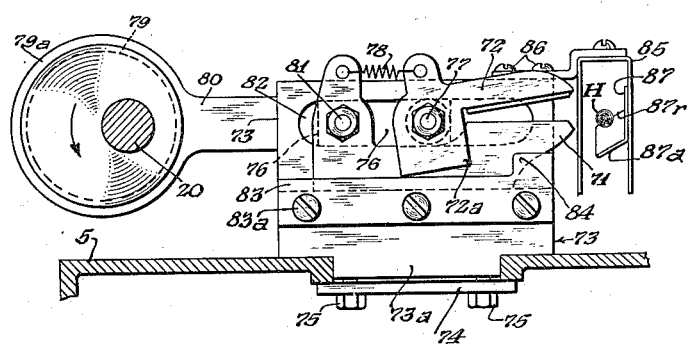
Fig. 16 is a view similar to Fig. 15 showing the cutting blades in their open position and showing how the cutting blades have been moved away from the wire after a completed terminal has been severed from the wire.
Figure 17:
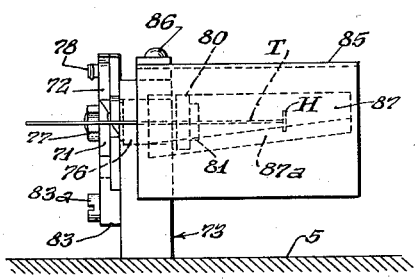
Fig. 17 is an end elevation, taken at the right-hand side of Fig. 16.

The cutting blades comprise a lower cutting blade 71 and an upper pivoted cutting blade 72. The lower cutting blade 71 is rigidly connected by a screw 81 to a slide block 76 which is slidably mounted in slot 82 of the base block 73. Said screw 81 also pivotally connects slide block 76 to arm 80. The block 76 is movable to-and-fro in a lateral direction, this direction being parallel to the plane of the paper in Fig. 16. The bearing or base block 73 can be longitudinally adjusted, since its head 73a is longitudinally slidable in a suitable slot which is provided in the frame of the machine, as shown in Figs. 15 and 16. After the base block 73 has thus been adjusted, it can be clamped in its adjusted position by means of the plate 74 which abuts portions of the frame of the machine. Said plate 74 can be rigidly connected to the member 73a, by means of screws or other fastening members 75. Upper blade 72 is pivotally connected at 77 to the slide block 76. A tension spring 78 (which may be omitted) normally holds the blade 72 in an open position. The operating shaft 20 is provided with an eccentric 79 which turns within the collar 79a of the usual arm 80, which is pivotally connected to the block 76. The stationary guide plate 83 has a shoulder 84 against which the tail 72a of the movable blade 72 strikes as the block 76 is moved towards the wire, thus closing the movable blade 72 and cutting the shank of the terminal T. This is shown in Fig. 15. The stationary guide plate 83 is fastened to the main bearing block 73 by means of screws 83a.

During the cutting operation, and in order to prevent the straight wire and the straight shank of the terminal from bending during the cutting operation, substantially all of said shank is located in a U-shaped guard 85. Said guard 85 is rigidly connected by means of screws 86 to the base block 73.

As shown in Fig. 16, a shell 87, which is made by bending a planar sheet of metal into angular shape, has one leg thereof connected to one of the legs of the guard 85. The head H of the terminal T is close to the free leg 87a of the shell 87, during the cutting operation. This planar free leg 87a is inclined with respect to the horizontal plane, so that, referring to Fig. 16, its rear edge 87r is higher than its front end. There is some clearance between the head H and this free leg 87a. During the cutting operation, the shank of the terminal will bend very slightly downwardly until the head H touches the leg 87a. Further downward movement of the terminal is thus prevented during the cutting operation, so that a clean cut is made which is perpendicular to the shank of the terminal, and without substantially bending the straight wire at the rear of the winding plate 60. When the completed terminal has been severed from the wire, it falls upon and it slides down upon the downwardly inclined member 87a to the outlet chute 88.

The operation of the machine is as follows:

The wire is fed into the machine intermittently by means of the slide carriage 7. At or about the end of each intermittent feeding movement, the plunger 42 is operated so as to clamp the wire, leaving a portion of the wire projecting through and rearwardly beyond the plate 60. The slide carriage 7 is then moved in its reverse stroke while the plunger 42 is maintained in its clamping position. At about the beginning of said return stroke, and after plunger 42 has clamped the wire, the arm 65 is operated so as to downwardly bend that portion of the wire which projects beyond the mandrel 63. One face of arm 65 is very close to the rear end face of mandrel 63. During the return stroke of the slide carriage 7, the downwardly bent portion of wire is wound so as to form the head H. After the winding operation has been completed, and before the next feeding stroke, the arm 65 is moved back to the position shown in Fig. 11. Prior to the next feeding stroke of the slide carriage, the plunger 42 releases the wire and the straight wire is fed longitudinally into the machine while slide 76 of the cutting blades is in its retracted position shown in Fig. 16 so that the wound head is moved rearwardly beyond the plane in which the cutting blades operate. The slide carriage 7 is now moved reversely, while plunger 42 clamps the wire. The cutting blades are moved laterally while plunger 42 clamps the wire and the movable cutting blade 72 is turned so as to cut off the wire. During said reverse movement of carriage 7, the arm 65 is operated so as again to bend the wire and thus permit the rotating plate 60 to wind a new head H. The cams are dimensioned and located and timed so as to produce this continuous succession of movements. The cutting operation is performed very rapidly. Hence the wire is cut and a new head is wound during each reverse stroke of carriage 7.

While the specific machine illustrated herein is intended for use in making the aforesaid terminal, said machine can be used for making any member having a shank and an integral wound head. The wound head may be of spiral or helical or any other shape.

A preferred embodiment of the invention has been illustrated but it is clear that numerous changes and omissions can be made without departing from the spirit of the invention.

While I have illustrated the formation of an article having a shank and an enlarged coiled head from wire having a circular cross-section, the invention applies to the use of other material.

In the embodiment described, separate means are shown for feeding the wire intermittently and for clamping the wire between feeding movements. However well known feeding mechanism, of numerous types can be used for this purpose and the invention is not limited to a machine in which the feeding means and the clamping means are separate mechanical devices.

For convenience I have referred to parts in one of the claims by reference numerals. It is to be understood that the use of such reference numerals does not limit the claim to the specific parts illustrated herein.

The member 39 is described in the claims as being a stationary member. This is not intended to limit such claims to a machine in which the member 39 is held stationary as it is sufficient if the winding member 60 is movable relative to the member 39, so as to wind the head of the device. The invention includes numerous valuable sub-combinations which need not be operative per se.

One of the important improvements of the invention and which results in reliable and high-speed operation is that the wire is fed in a straight line through the machine along a predetermined line, and the various operations do not bend the wire laterally relative to said predetermined line, with the exception of the bending operations which are necessary for winding the head.

While this is an important feature of my invention, the broader aspects thereof are not limited to a machine or method whereby the wire is always fed in a predetermined straight line.

The end-face 43 of the clamping bar may be smooth and planar, or it may have a groove for receiving and clamping the wire W.

When the head is wound on mandrel 63, said head has a slight grip or no grip on the mandrel. The wire is sufficiently stiff to push the head off the mandrel.

An important feature of the invention is that the straight wire is held against bending, or against any substantial bending, during the cutting of the wire. If a kink is formed in the wire at the point where the wire is cut, this will interfere with the proper bending of the wire in the operation of forming the next head. The bent portion of the wire, which is shown in Fig. 12, for example, should be perfectly straight and free from any kink or bend at the free tip thereof. The bending or kinking of the wire during the cutting operation is prevented by supporting the wire at or adjacent the head thereof, during the cutting operation.

I claim:

1. A method of making an article having a shank and an integral coiled head which consists in feeding the wire intermittently and in straight form in a predetermined path, gripping the wire beyond the free end thereof between feeding movements, coiling a portion of the wire at the free end thereof so as to form an enlarged head while the shank-portion of the wire is held straight and stationary, cutting off from the wire the shank-portion of the article while the shank-portion is held straight and stationary, the shank-portion being thus cut off after the enlarged head has been formed and supporting the wire in front of the region of cutting during said cutting operation so that the wire is maintained substantially straight at the region of cutting.

2. A machine of the type described, comprising means adapted to intermittently feed wire forwardly through said machine in a straight line and to hold the wire against rearward movement between feeding periods, bending and winding mechanism located and adapted to bend a portion of the free end of the wire into an enlarged head while the wire is held stationary, cutting mechanism located and adapted to cut the wire at a point spaced from said head and subsequent to the formation of said head, supporting means adapted to maintain the wire substantially straight during the cutting operation between said head and the region of cutting.

3. A machine of the type described, comprising means adapted to intermittently feed wire forwardly in a straight line into said machine and to hold the wire against reverse movement between feeding movements, a stationary member having a bore through which the wire is fed, said stationary member having a mandrel projecting from an end-face of said stationary member, said mandrel having a longitudinal bore and a lateral slot branching from said longitudinal bore, bending mechanism adapted to bend an end-portion of the wire into said lateral slot, a turnable winding plate having an eccentrically-mounted projection which is adapted to wind the bent portion of the wire around the rim of said mandrel to form a head, cutting mechanism operated to cut the wire at a point spaced forwardly from said plate and after the head has been formed, means adapted to operate said cutting mechanism when said head is located forwardly of said winding plate and after said head has been formed, supporting means adapted to support the wire against substantial bending, said supporting means being located forwardly relative to said cutting mechanism, said cutting mechanism being timed to cut the wire after said head has been formed.

4. A machine of the type described, comprising means adapted to feed the wire intermittently into said machine, a stationary member 39 having a longitudinal bore 39a through which the wire is fed, a laterally reciprocable plunger 42 which is adapted to clamp a part of the wire which is located in said bore 39a, automatic means adapted to reciprocate the plunger 42 so as to release the wire during feeding movements and to clamp the wire between feeding movements, said stationary member 39 having a mandrel 63 projecting from the rear end-face thereof, said mandrel having a longitudinal bore which is aligned with bore 39a, said mandrel 63 having a lateral slot 64 branching from its longitudinal bore, a bending bar 65, automatic means adapted to operate said bending bar so as to bend a portion of the wire into the lateral slot 64 while the wire is held clamped, a turnable winding plate 60, means adapted to turn said winding plate around an axis which is substantially coincident with the axis of bore 39a, said winding plate 60 having an eccentrically located projection 70, said projection 70 being located to wind the bent portion of the wire around the rim of the mandrel 63 so as to form a head, cutting mechanism adapted to cut the wire at a point spaced from said boss, and means adapted to actuate said cutting mechanism when said head is spaced rearwardly from said winding plate 60.

5. A machine of the type described, comprising means adapted to intermittently feed wire forwardly through said machine and to hold the wire against rearward movement between feeding periods, bending and winding mechanism located and adapted to bend a portion of the free end of the wire into an enlarged head while the wire is held stationary, a block mounted for slidable to-and-fro movement in a lateral direction, a first cutting blade fixed to said block, a second cutting blade pivoted to said block, the second cutting blade having a tail, said machine having an abutment member against which said tail strikes at a predetermined point in the operative stroke of said block so that the second cutting blade is actuated to cutting position, means adapted to actuate said block to the point at which said tail contacts with said abutment after said bending and winding mechanism has been operated.

6. A machine of the type described, comprising means adapted to intermittently feed wire forwardly through said machine and to hold the wire against rearward movement between feeding periods, bending and winding mechanism located and adapted to bend a portion of the free end of the wire into an enlarged head while the wire is held stationary, a block mounted for slidable to-and-fro movement in a lateral direction, a first cutting blade fixed to said block, a second cutting blade pivoted to said block, the second cutting blade having a tail, said machine having an abutment member against which said tail strikes at a predetermined point in the operative stroke of said block so that the second cutting blade is actuated to cutting position, means adapted to actuate said block to the point at which said tail contacts with said abutment after said bending and winding mechanism has been operated, said block being mounted in a base block which is adjustable in a direction parallel to the direction of feed of the wire.

PATTERSON O. STEWART.